(12) United States Patent
Amit

(10) Patent No.: US 7,127,734 B1
(45) Date of Patent: Oct. 24, 2006

(54) SYSTEM AND METHODS FOR HOME NETWORK COMMUNICATIONS

(75) Inventor: Mati Amit, Zur-Yigal (IL)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/548,048

(22) Filed: Apr. 12, 2000

Related U.S. Application Data

(60) Provisional application No. 60/128,810, filed on Apr. 12, 1999.

(51) Int. Cl.
*H04N 7/18* (2006.01)

(52) U.S. Cl. .......................................... 725/80; 725/82

(58) Field of Classification Search .................. 725/74, 725/78, 80, 81, 82, 85, 111, 110, 131, 133, 725/139, 141, 151, 153; *H04N 7/18, 7/16*
See application file for complete search history.

(56) References Cited

U.S. PATENT DOCUMENTS

| | | | |
|---|---|---|---|
| 4,534,024 A | 8/1985 | Maxemchuk et al. | |
| 4,554,656 A | 11/1985 | Budrikis et al. | |
| 4,675,866 A | 6/1987 | Takumi et al. | |
| 4,885,747 A | 12/1989 | Foglia | |
| 4,935,924 A * | 6/1990 | Baxter | 370/73 |
| 5,255,267 A | 10/1993 | Hansen et al. | |
| 5,283,789 A | 2/1994 | Gunnarsson et al. | |
| 5,351,234 A | 9/1994 | Beierle et al. | |
| 5,365,264 A | 11/1994 | Inoue et al. | |
| 5,499,047 A | 3/1996 | Terry et al. | |
| 5,539,880 A | 7/1996 | Lakhani | |
| 5,565,910 A | 10/1996 | Rowse et al. | |
| 5,579,308 A | 11/1996 | Humpleman | |
| 5,585,837 A | 12/1996 | Nixon | |
| 5,760,822 A | 6/1998 | Coutinho | |
| 5,790,806 A | 8/1998 | Koperda | |
| 5,797,010 A | 8/1998 | Brown | |
| 5,805,806 A | 9/1998 | McArthur | |
| 5,812,930 A | 9/1998 | Zavrel | |
| 5,878,324 A * | 3/1999 | Borth et al. | 455/3.1 |
| 5,881,362 A | 3/1999 | Eldering et al. | |
| 6,061,719 A * | 5/2000 | Bendinelli et al. | 709/218 |
| 6,069,899 A | 5/2000 | Foley | |
| 6,081,519 A | 6/2000 | Petler | |
| 6,091,440 A | 7/2000 | Kokkinen | |
| 6,091,932 A | 7/2000 | Langlais | |
| 6,112,232 A | 8/2000 | Shahar et al. | |
| 6,134,223 A | 10/2000 | Burke et al. | |
| 6,161,011 A | 12/2000 | Loveless | |
| 6,166,730 A | 12/2000 | Goode et al. | |
| 6,175,861 B1 | 1/2001 | Williams, Jr. et al. | |
| 6,188,397 B1 | 2/2001 | Humpleman | |
| 6,189,148 B1 | 2/2001 | Clark et al. | |
| 6,195,797 B1 | 2/2001 | Williams, Jr. | |
| 6,209,025 B1 | 3/2001 | Bellamy | |
| 6,282,714 B1 * | 8/2001 | Ghori et al. | 725/81 |
| 6,452,923 B1 | 9/2002 | Gerszberg et al. | |
| 6,615,407 B1 * | 9/2003 | Inaguma | 725/78 |
| 6,622,304 B1 * | 9/2003 | Carhart | 725/74 |
| 6,637,030 B1 * | 10/2003 | Klein | 725/78 |

* cited by examiner

*Primary Examiner*—Vivek Srivastava
(74) *Attorney, Agent, or Firm*—Abdul Zindani; W. James Brady, III; Frederick J. Telecky, Jr.

(57) ABSTRACT

The present invention provides the ability to use existing cable TV wires for home networking.

18 Claims, 8 Drawing Sheets

SYSTEM AND METHODS FOR HOME NETWORK COMMUNICATIONS

This application claims priority under 35 USC §119(e)(1) of Provisional Application No. 60/128,810, filed Apr. 12, 1999.

TECHNICAL FIELD OF INVENTION

The present invention relates to communications systems, and more particularly, to systems and methods for home network communications.

BACKGROUND OF INVENTION

Home networking is a key technology for the evolving home infotainment market, and it is expected to become a very large market by itself within the next decade. Home networks will connect between computing devices (personal computers, palm computers, network computers, etc.), entertainment devices (TV, VCR, DVD player, video camera, audio systems, etc.), I/O devices (printer, scanner, headsets, keyboards, remote controls, mouse, loud-speakers, etc.), home appliances, and modems (such as cable modems, DSL modems, and PSTN modems) that connect the home outside. The home network will enable a wide range of application such as internet sharing, peripheral sharing, file and application sharing, and home automation. The home network will distribute the computation power of the computer from the study room to the living rooms.

There are several home networking solutions that have already been proposed, including networking over the existing telephone wiring (e.g. HomePNA), networking over the existing power lines, short range wireless networks (Bluetooth), medium range wireless networks (e.g. HomeRF, IEEE802.11), and solutions that require new wiring, such as IEEE1394 (I.LINK) or CAT 5 Ethernet wiring.

Existing Telephone wiring (HomePNA) generally allows ordinary voice telephone calls to be carried over the wire, while at the same time providing up to several megabits of data throughput.

It is also possible to use the normal AC electrical wiring in the home for data transmission. Electrical wiring has been used in the past for low bit-rate data applications (e.g. home automation). Technologies for achieving multi megabit throughput on existing residential electrical wiring are under investigation in the industry.

Wireless technologies (Short-range wireless; Bluetooth; HomeRF; IEEE 802.11) provide several megabits of throughput; however, their effectiveness can vary, depending on the size of the house, the proximity of other wireless networks, and other sources of noise.

The IEEE 1394 (i.LINK) standard defines a serial interface between digital devices. This inexpensive, easy-to-use and high-speed bus handles multimedia bandwidth requirements and provides a universal interface for a variety of devices. By allowing seamless data exchange between devices such as workstations, personal computers and digital televisions, VCRs, camcorders and set-top boxes, it enables a. new generation of computers and consumer electronic devices to operate in a common environment.

Originally developed as an interface to replace SCSI, IEEE 1394 offers bi-directionality, high data transfer rates and isochronous data transfers. This fire-wire technology required special wires.

For new homes, it is anticipated that standard Category 5 wiring can supplement twisted-pair telephone wiring. The added cost of including this extra wiring is low and the benefits reaped can be great, because 100BaseT and other high-speed network types work well over this cable.

TV wiring that consist of coaxial cables are used to connect the antenna/cable TV output, typically via passive splitters, to the cable outlets at specific points in the home. Typical home TV wiring scenarios are depicted in FIG. 1.

The signals transmitted over the in-home coaxial TV wiring may include regular video channels, data channels for fast Internet access (using e.g., DOCSIS cable modem), voice channels for telephony over cable, pay-per-view, control signals and more.

Technically, to use the in-home TV wiring for home networking applications, one may connect standard cable modems through the cable TV (CATV) system. Data from one cable modem can be transmitted to the other cable modem via the CATV head-end.

Such a configuration has several drawbacks: (1) it loads the system, possibly above the typical headend system capacity; and (2) it introduces large delays that cannot be tolerated by at least some of the applications. Therefore, it is unlikely that cable operators will adopt such configuration.

It should be noted that a cable modem could be used to connect any type of home networking system to external (out of the home) networks, such as the Internet.

A home networking solution may also be built at a home that does not connect to the cable infrastructure (i.e. a home that is connected to a standard home antenna, a satellite dish, another access network (xDSL), or a wireless local loop).

SUMMARY OF INVENTION

The present invention provides a system and methods for communication between subscribers' devices over cable infrastructure designed to carry video signals, using passband frequency bands, without transmission through a CATV headend device. A particular application of this system and method is home networking over coaxial TV cables. The disclosed system will allow very high-speed digital and analog communications within the home and from the home to external devices or networks using low cost devices.

The present invention provides home networking solutions that utilize in-home TV wiring for supplying high rate connectivity between any two home networking nodes. The present invention does not load the city cable TV (CATV) network.

In many, if not most, of US residential homes, there are several TV inlets, connected by coaxial (coax) cables to either a municipal CATV network or a TV antenna. This coax cable is an excellent communication medium, as it has a high bandwidth and it is shielded to avoid noise. The present invention provides a method and system which allows home networking over these coax cables, allowing for very high data rates and a low cost implementation. The term Home Cable Network (HomeCN) is used herein for the system of the present invention.

In the prior art (e.g. the DOCSIS 1.0 spec), a CATV infrastructure is utilized for communication between a subscribers' devices (e.g. cable modem) and a headend, thus, two subscribers' devices can communicate via the headend. The system and method of the present invention is based on direct communications between two subscribers' devices, without transferring the data via a headend, thus allowing for high data rates between units in a home without reducing the capacity of the regional CATV network.

In the prior art, coaxial cables have been used for local area networks (LAN) and for analog communications. The system and method of the present invention is designed for cable networks that carry video or other information from a headend or an antenna, and thus it is different from prior art LAN over coaxial cables. Furthermore, the method employs a new digital modulation scheme based on pass-band RF signaling, which is fundamentally different than prior art LAN and analog modulation over coaxial cables.

The present invention enables installation of modems, connected to different types of nodes of the CATV, to enable communication between these nodes. The present invention provides a way to transfer data between these nodes, when the data is not required to be transferred to the headend.

The present invention provides a low cost solution, which is very important to enable a solution for the mass market.

A summary of some of the key principles of the disclosed system and methods are noted below.

1. Subscribers' devices may communicate directly (not via the headend) using RF signaling over the coax cable. These signals will typically propagate between the devices via reflections from other devices in the line, e.g. splitters or amplifiers in the line.
2. When the home coaxial cables are connected to a local or regional CATV network, the HomeCN is done in an out-of-band frequency (i.e. band that is not in use, e.g. above 860 MHz), or in part of the downstream band (e.g., within the range of 100–860 MHz) which is allocated (e.g. by the cable operator) for home networking applications.
3. When the home coaxial cables are connected to a local or regional CATV network, there is frequency re-use between portions of the CATV plants (i.e. same frequency range is allocated to different users in a CATV plant), taking into account the isolation between those users due to the attenuation of the cable plant.
4. The frequency re-use can be improved by adding filters within the signal path in the local or regional CATV network. The quality of the signal transmitted by one subscriber device to another subscriber device can be further improved by deliberately using splitters with high reflections.
5. The home devices may also be capable of connecting to the headend, e.g. operate as a DOCSIS or DVB cable modem or set-top box, either simultaneously with connecting to other devices in the home, or in an alternative mode in which a device switches between cable modem functionality and connecting to the other in-home devices. Parts of the device that are capable of connecting to a headend can be used for both home networking and for cable modem functionality, thus reducing the implementation cost of the home networking functionality. An architecture is proposed in which the home network includes only one device, which can operate both as a cable modem and as a home-networking device. In this architecture, all the other devices can communicate only over the home network, and if one of these devices need to communicate outside the home, it communicates via the device with the cable modem functionality. Other devices that have home networking and cable modem functionality may also handle a direct connection. The home networking functionality will be implemented in cable modems, and particularly in host-based cable modems, which are installed in personal computers and use the processor of the personal computer to perform some of the functionality of the cable modem and the home cable networking. More generally, the home networking devices will be installed in various kinds of devices that employ general purpose computers (such as a laptop computer, a network computer, a TV, a DVD device, or even certain cellular phones), and use their general purpose processors to perform home networking functionality, thus reducing the implementation cost of the home networking functionality.
6. In a particular implementation of the method, when the home coaxial cables are connected to a local or regional CATV network, each home device addresses the headend, and the headend assigns the carrier frequency and bandwidth to each home network, and maximum power levels to each device on the home network. The specific power level is assigned by the home networking devices that exist in each specific sub-network. In another implementation of the method, the devices search for a non-occupied frequency sub-band within a band that is pre-assigned for home networking, and once such a sub-band is found they use it for their needs. When a home CN device is initialized it is trying to "join its home network", that is trying to communicate with other devices in the same home and adopt their frequency band and protocol.
7. In a particular implementation of the method, the devices that share a home network are based on the IEEE 802.11 MAC layer. This protocol is in common use and is a collision avoidance multiple access protocol that supports priorities.
8. In a particular embodiment of the present invention, the splitter at the input to the user premises is replaced by a special splitter device that supplies higher quality home networking capabilities, or a filter is connected to the splitter. A passive filter connected to the splitter insures that the home networking signals in a specific home will not interfere with or be interfered by other home networks. This passive filter provides a "single home" operational mode that allows for low cost equipment and frequency re-use. A home network splitter that supplies less isolation between the home drops and includes the filter inside is also provided. This home network splitter provides better performance for the home network. An active device receives signals from a TV antenna or a regional CATV network and receives signals from subscribers' devices via the home coax lines, and functions as a repeater for communications signals between subscribers' devices as well as between subscribers' devices to a headend (in case the home is connected to a regional CATV network), while still allowing transparent transition of video signals from the TV antenna or the regional CATV network into the home.
9. In a particular embodiment of the present invention, the home coax network connects portions of the home (e.g. rooms or floors), and its terminals have inputs and outputs for wireless connections within these portions.
10. In a particular embodiment of the present invention, home CN devices have an interface to another communication link, such as IEEE1394 link (I.LINK), thus the home coax network is used to extend the range of the other link.
11. In a particular embodiment of the present invention, home CN devices have an interface to another communication link, such as Bluetooth, thus the home coax network is used to extend the range of Bluetooth coverage by supplying pico-cells that are connected between themselves and cover the required home area.

12. In cases where direct communications between home devices is not feasible (e.g. due to a highly balanced splitter that has very low reflections), the home devices may have a fallback option of communicating via a regional CATV headend.
13. The data transmitted in the coax home network may be secured (i.e. encrypted).

As used herein, the term a "home network" means a local network; it does not necessarily have to be in a home. For example, it may be in an office, or in a complex that contains several homes (e.g. an apartment building).

DESCRIPTION OF DRAWINGS

The preferred embodiments of the invention as well as other features and advantages thereof will be best understood by reference to the detailed description which follows, read in conjunction with the accompanying drawings, wherein.

DETAILED DESCRIPTION

Figure 1:
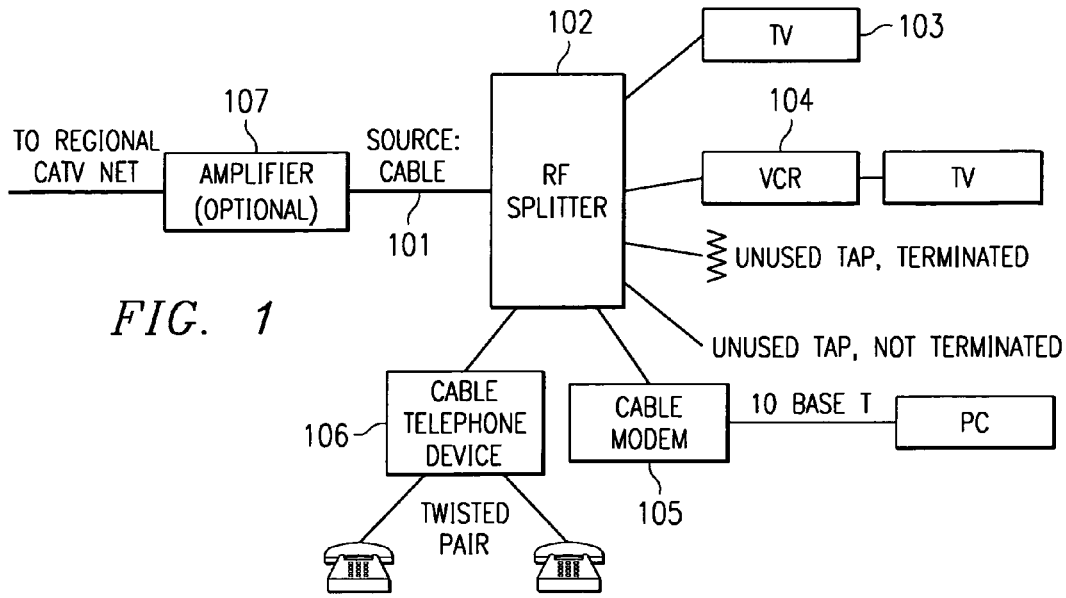
FIG. 1 shows a home that has four nodes inside the home and is connected to a regional CATV plant.

FIG. 1 presents the structure of the existing regional CATV network.

The typical home coaxial cable infrastructure consists of a Cable Source [101] which is connected to the home Splitter [102] (the home splitter might be Customer Premises Equipment—CPE). Some wires connect the interfaces at home to the splitter. The components that can connect to the network are TV [103], VCR [104] that is connected to TV.

Cable Modems (CM) [105] (e.g. DOCSIS CM), and Cable Telephone Device [106] that connects some phones via the cable infrastructure (e.g. using VoIP protocol over DOCSIS channel).

An amplifier [107] can be added in the entrance of the home/house to increase the signal power. (If CM equipment exists at home, this amplifier should be bi-directional amplifier that amplifies the signal to home side (DS) in the 100 MHz–860 MHz frequency range, and amplifies the signal to the headend side (US) in the 5 MHz–44 MHz frequency range).

There are some major types of HomeCN components (see FIG. 2):

HCNI: Home Cable Networking Interface.
A sub-component that supply Home Cable Networking interface. This sub-component is a part of specific equipment (e.g. PC, TV, DVD) [204,205].

HCNU: Home Cable Networking Unit
A component that supply connection to the Home Cable Networking. This component is a separate unit that contains one or more interfaces to the home equipment (e.g. 10BaseT, USB, wireless). This component does bridging or routing between the HCN to the other interfaces (networks) [207,212].

HCNM: Home Cable Networking Modem
A component that include HCN-U and cable modem (e.g. DOCSIS cable modem).
This component supplies a connection to the Home Cable Networking, and a connection to the cable headend. This component is usually a separate unit that also contains one or more other interfaces (e.g. 10BaseT, USB, wireless). This component does routing between the HCN network, the cable network and the other interfaces networks [206].

Figure 2:
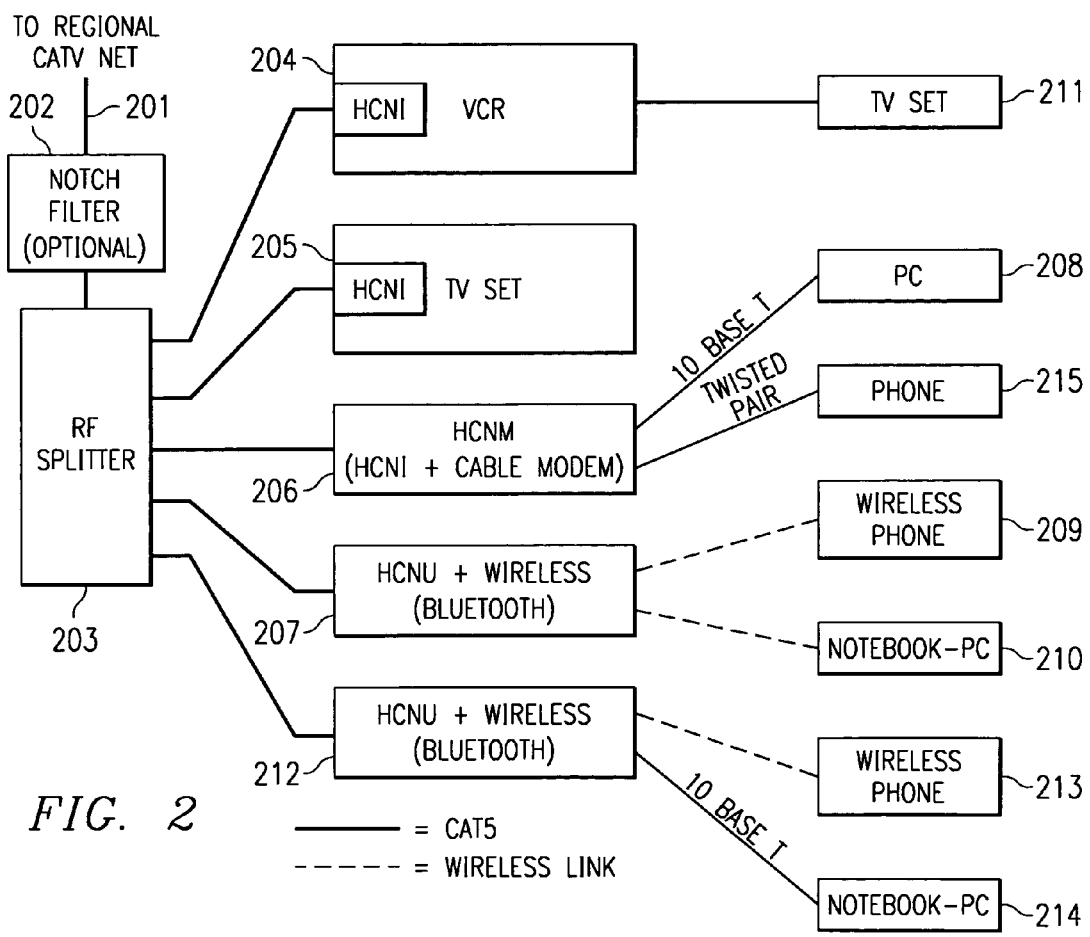
FIG. 2 shows an example of a preferred embodiment of the home network method and system connected to a regional CATV plant.

FIG. 2 shows an example of a preferred embodiment of the disclosed method and system.

FIG. 2 shows a Home Cable networking (HomeCN/HCN) that has 5 nodes [204–207, 212] of the CATV network, and it is connected to the regional CATV plants via cable [201]. Notch filter [202], is a band reject filter that does not pass a certain RF range that is used by the home networking devices [204–207, 212]. This filter improves the isolation between the home network and other homes as well as the regional network. However, the use of such a filter is optional, as we believe that the disclosed system and method is functional with the isolation levels of the CATV network without the additional notch filtering [202]. RF splitter [203] splits the signal coming from and to the regional CATV plant [201], to the signals coming to and from units [204–207, 212] respectively. The signals arriving to RF splitter [203] from the home units [204–207, 212] are partially reflected back to these home units [204–207]. It may be recommended to use splitters that deliberately have high reflection levels (although we believe that the method and system can operate with typical commercial splitters). The Video Cassette Recorder (VCR) [204] and TV set [205] include Home Cable Networking Interface (HCNI) devices. The Personal Computer (PC) [208] is connected to a Home Networking Cable Modem (HNCM) device [206] (that supplies the Home Networking functionality and the Cable Modem functionality). The HCNM is also connected to a phone [215] and supplies the VoIP functionality. A PC that includes HCNI can be connected directly to the HCN. The HCNU+wireless units [207, 212] are connected to the CATV and has a wireless output (e.g. Bluetooth, HomeRF or infra-red) which connects to devices within the vicinity of the device [207], such as wireless telephone unit [209, 213], and a notebook computer [210]). The HCNU devices are capable of transmitting and receiving digital communications signals between them. These signals propagate in the CATV wires and are reflected by the RF splitter [203]. The HCNM device is further capable of operating as a DOCSIS cable modem and communicating with a headend of a regional CATV plant [201]. The HNCI's, the HCNU's and the HNCM use Home Cable Network Protocol HCNP.

The HomeCN can also be used to supply full home coverage by the Bluetooth network. To enable this coverage some HCNU+Bluetooth components that are connected to HomeCN should be exist in the home [207, 212]. The person that is traveling between the rooms with his wireless phone [209, 213] or with his notebook computer [210] can be connected to the appropriate Bluetooth station in the home.

We note that the method and system will still be capable to perform home networking if the home coaxial wiring is not connected to a regional CAT plant [201], but connected to TV antenna, or even disconnected. However, in such cases the home network will not allow the capability of connecting the home outside through the CATV, as done by the HCNM unit [206].

The HomeCN operation modes are determined according to the existence/not existence of notch filter at the home entrance (see FIG. 2).

The notch filter in the entrance of the home is a one of the basic elements in the home network design. If this notch filter exists in the HomeCN is disconnected from the regional cable network, therefore its' design is more simple (single home network). When this filter does not exist the home network is part of the regional network, therefore its' design is more complicated, and some additional functionality is required.

The HomeCN Supports Two Operation Modes:
 Single Home operation mode—This mode required a Notch filter, or an amplifier that usually supplies similar functionality, or it can be operated in a system that is not connected to the CATV plant.
 Connected Home operation mode—This mode does not require a Notch Filter. This mode is more complex and requires additional functionality. Following are some functionalities that are required in the Connected Home operation mode: Wider frequency operation, frequency selection (FDM), multiple bandwidth, privacy, capability to be managed by the headend.

Notes:
 The notch filter can be passive component or an active component. An active component that also has management can supply some additional functionality. An example of an important functionality is to answer to the query "Is notch filter exist". This query can be used by the HCNP to verify the type of operating mode that should be handled if the components supply the two modes.
 Notch filter added to the home network design usually reduces the price and increase the performance of the home networking.
 The default operation mode is Single Home. The management system configures the components to the appropriate mode after initialization.
 The Connected Home operational mode is recommended only if it is managed by the CMTS.

Figure 3:
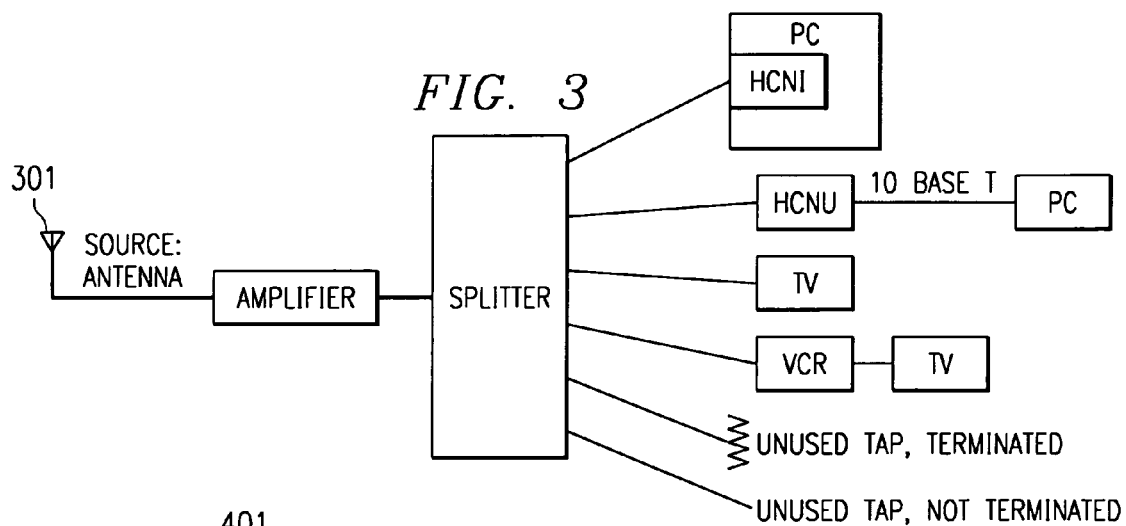
FIG. 3 shows an example of the present invention, not connected to a CATV.

FIG. 3 presents a Home Networking network that exist at a house that is not connected to the Regional Cable infrastructure. Instead, it is connected to a local antenna [301]. This system is operates in Single Home operational mode.

Figure 4:
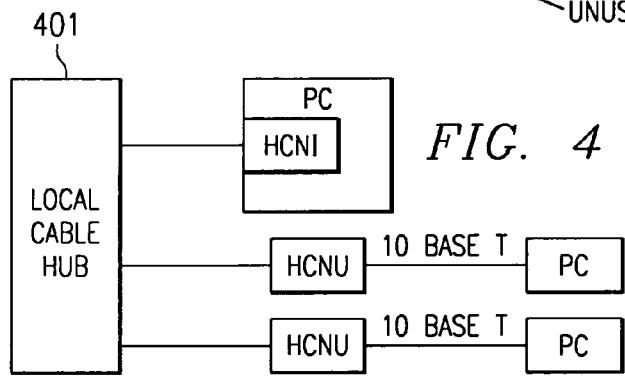
FIG. 4 shows an example of HomeCN with a hub.

FIG. 4 presents HomeCN with a local cable hub. A Local Cable HUB [401] connects the HCNUs and the HCNIs. This system is operates in Single Home operational mode.

Figure 5:
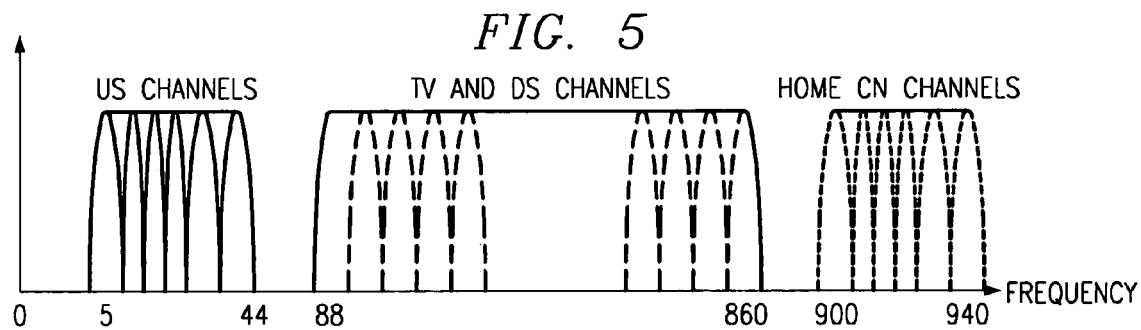
FIG. 5 presents a frequency allocation that may be employed by the present invention.

FIG. 5 presents a typical channel allocation. This figure is suitable for example to a system that supplies TV channels, DOCSIS CM (US and DS), and HomeCN channels.

In the present figure, some of the HomeCN channels have a different width.

HomeCN components that are working in the single home operation mode (reduced mode) always use the 900–906.25 MHz channel. These components do not support the frequency selection capability, and different channel bandwidth capability.

There is an additional mode 'Dual Frequencies Mode'. In this mode there is a different frequency- range to the transmitted information and a different frequency-range to the received information. In this mode a transponder at the entrance of the home transfers all the signals that are sent in the transmitted frequency-range to the received frequency-range. The major benefit of this method is decreasing the influence of the in-home echo (For more details see Dual Frequencies Mode appendix).

Note:
 The HomeCN-P is defined by specifying the two lower communication layers: the physical layer and the data link layer.
 The preferred frequency and the preferred frequency range (bandwidth) are selected according to the operational mode.

|  | Connected Home operation mode | Single Home operation mode |
| --- | --- | --- |
| Frequency range | higher than 860 MHz; usually 900–960 MHz | 900–906 MHz |
| RF channel spacing (bandwidth) | 8 MHz or lower, according to the required rate | 6.25 MHz |

The modulation method is QPSK, QAM 16, QAM 64 or QAM 256 according to the channel conditions, and according to the equipment capabilities.

The modulator of the home networking device MUST provide QPSK and QAM 16.

The modulator of the home networking device MAY provide QAM 64 and QAM 256.

The modulator MUST provide 2,560 ksym/sec.

The modulator MAY provide 160, 320, 640, 1,280, and 5,120 ksym/sec.

FEC (Forward Error Correction) MUST support R-S (Reed Salomon) T=0,10.

FEC (Forward Error Correction) MAY support R-S (Reed Salomon) T=0, . . . ,10.

The Channel Allocation method is FDM—a specific frequency for each home network.

The frequency plan is done only in connected home operational mode. In this case it done by the management system.

The structure of the HFC is important for understanding the home networking when the system is in Connected Home operation mode. This structure is used for enabling frequency reuse.

The HFC system usually contains the following components (see FIG. 6):
 Headend (CMTS) [601] usually with fiber output.
 Fibers [602] that exist only in HFC (Hybrid Fiber Coax) environment and connect the Headend to the cabinets (Fiber Nodes) [603]. The cabinets include fiber to coax converters (O–E).
 Coax wires that connect the different components [604, 606, 607, 610, 611 . . . ].
 Amplifiers that increase the signal power, and also filter the frequencies that are not amplified [605, 608, 609]. (These amplifiers might include splitters)
 Splitters that get a single wire as input, and some wires as output. [605, 608, 609, 612, 613, 614, 619, 622].

The splitters are divided into two types: Active splitters that usually include the amplifier inside, and passive splitters, that usually only divide the power between the different ports.

The active splitters are usually used close to the CMTS (headend) side. The passive splitters are usually used in the house entrance and in the flats (near to the home end equipment).

The Attenuation and Isolation are Used for Two Major Subjects:

Branches calculation—Dividing the HFC Network to Branches. The branches are the key for frequency reuse. Branch calculation should be done before frequency allocation for each HomeCN in the global HFC infrastructure.

HomeCN home network—Understanding of the home network conditions.

These aspects are required for the HomeCN component and protocol design.

The HFC infrastructure is similar to a tree. This tree build with connection points that supplies isolation between the sub-trees. The components that exists in the network (e.g. Amplifiers, splitters, and filters) supplies attenuation of the signal, except the amplifier that supply amplifying (only if it was designed to amplify the required frequency in this direction). This attenuation is also can be used for isolation between the sub-trees.

The key element for efficient frequency allocation to the HomeCN is frequency reuse.

To enable calculation of the frequency reuse in a different sub-trees, the term branch will be used. Branches are defined as sub-networks that can use any home networking frequency without interference another sub-network that exist in another 'branch' and reuse the same home networking frequency.

The cable network can be divided to 'branches' because the tree structure supplies attenuation between its branches. The attenuation is granted by the coaxial cables and by components that include filters. Some of the splitters also provide good isolation between the sub networks that are connected to these components.

The HomeCN is based on FDM (see HomeCN protocol), therefore each home gets its own frequency range. The ability to supply reasonable frequency range for each home is based on the network infrastructure and on the ability to reuse the after dividing the network to branches.

The size of the 'branches' can be reduced by adding filters. These filters enable increasing of the frequency reuse. These filters are usually passive filters that are relatively small and can be added easily by the cable operator, or by the user at the home entrance. This mechanism of adding low cost filters at the entrance of a home/flat enables a single home/flat branch, and enables the Single Home operation mode.

The frequency resources are limited. To increase the frequency resources one (or more) of the following methods can be used:

Frequency Reuse: Enabling simultaneous usage of the same frequency by some customers.

The 'branches' method is a method to support the isolation of customers group. This method enables reusing of the same frequency in separate groups. This method uses the attenuation characteristic of the existing components. The disadvantage of this method is the management complexity. The operator should be aware of its physical infrastructure attenuation characteristic.

Supports wider frequency range.

This option can be handled by building equipment that supports a wider range. The disadvantage of this method is higher price of the components that are required to support wider range, because wider range support increases the complexity of each component.

The 'branches' method is very cost effective, and it increase the robustness of the home networking solution. Therefore, this document includes a detailed definition of this method.

The 'branches' approach enables reuse of the same RF frequencies, which allows the following benefits:

It enable the manufactures to reduce the price of the home networking equipment, because home networking equipment can support a smaller range of frequencies.

It enables allocating a larger frequency range for each home/flat. This wider range can supply higher network capacity.

The Attenuation/Isolation calculations can be done by adding the attenuation of each component and the attenuation of the wire in the required pass and in the required direction.

The following table (table 1) presents the typical attenuation of the basic components.

TABLE 1

Attenuation/Isolation Calculation

| Component Type | Signal Attenuation [dB] For frequency range of 900–960 Mhz |
|---|---|
| Coaxial Wiring | _0.21 dB for meter (RJ 59 type). Notes: The isolation is depended in the wiring quality. Cable attenuation. Depends on cable length and signal frequency. |
| Passive splitter 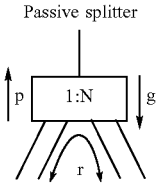 | g - Insertion loss: $10\log_{10}(N)$: Theoretical $3_{(N=2)}$, $6_{(N=4)}$, $9_{(N=8)}$ Example of real values $4.2_{(N=2)}$, $8.2_{(N=4)}$, $12.5_{(N=8)}$ p - backward attenuation of downstream amplifier: $10\log_{10}(N)$: $3_{(N=2)}$, $6_{(N=4)}$, $9_{(N=8)}$ r - Isolation: 20–30 corresponding to the quality |
| Active splitter 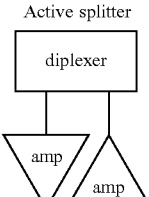 | g - downstream amplifier gain: $10\log_{10}(N)$: $3_{(N=2)}$, $6_{(N=4)}$, $9_{(N=8)}$ (The amplifying functionality should be added). p - backward attenuation of downstream amplifier: ~55 dB. (The attenuation is lower when the power supply is disconnected). r - :20–30 corresponding to the quality (higher g in better quality) |
| Notch Filter | g - 40–60 dB |

TABLE 1-continued

Attenuation/Isolation Calculation

| Component Type | Signal Attenuation [dB] For frequency range of 900–960 Mhz |
|---|---|
| 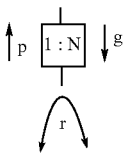 | p - 40–60 dB<br>r - 0.5 dB or 19 dB according to the design. |

Data Form 1: Components Parameters

Components' Parameters

| Component | Parameter | Value[dB] | | | | Comments |
|---|---|---|---|---|---|---|
| Wires | dB/meter | RG-59<br>0.21 | RG-6 | RG-7 | RG-11 | |
| | | N = 2 | N = 4 | N = 8 | | |
| Passive splitter | Insertion<br>Loss | 4.2<br>22 | 8.2<br>25 | 12.5<br>30 | | 20–30 |
| | Isolation<br>Return<br>Loss | 11 | 11 | 12 | | |
| Amplifiers | Amplifing<br>Isolation<br>Return<br>Loss | | | | | |
| Transmitter<br>Isolator<br>Notch Filter | Return<br>Loss | 10 | | | | |

Figure 6:
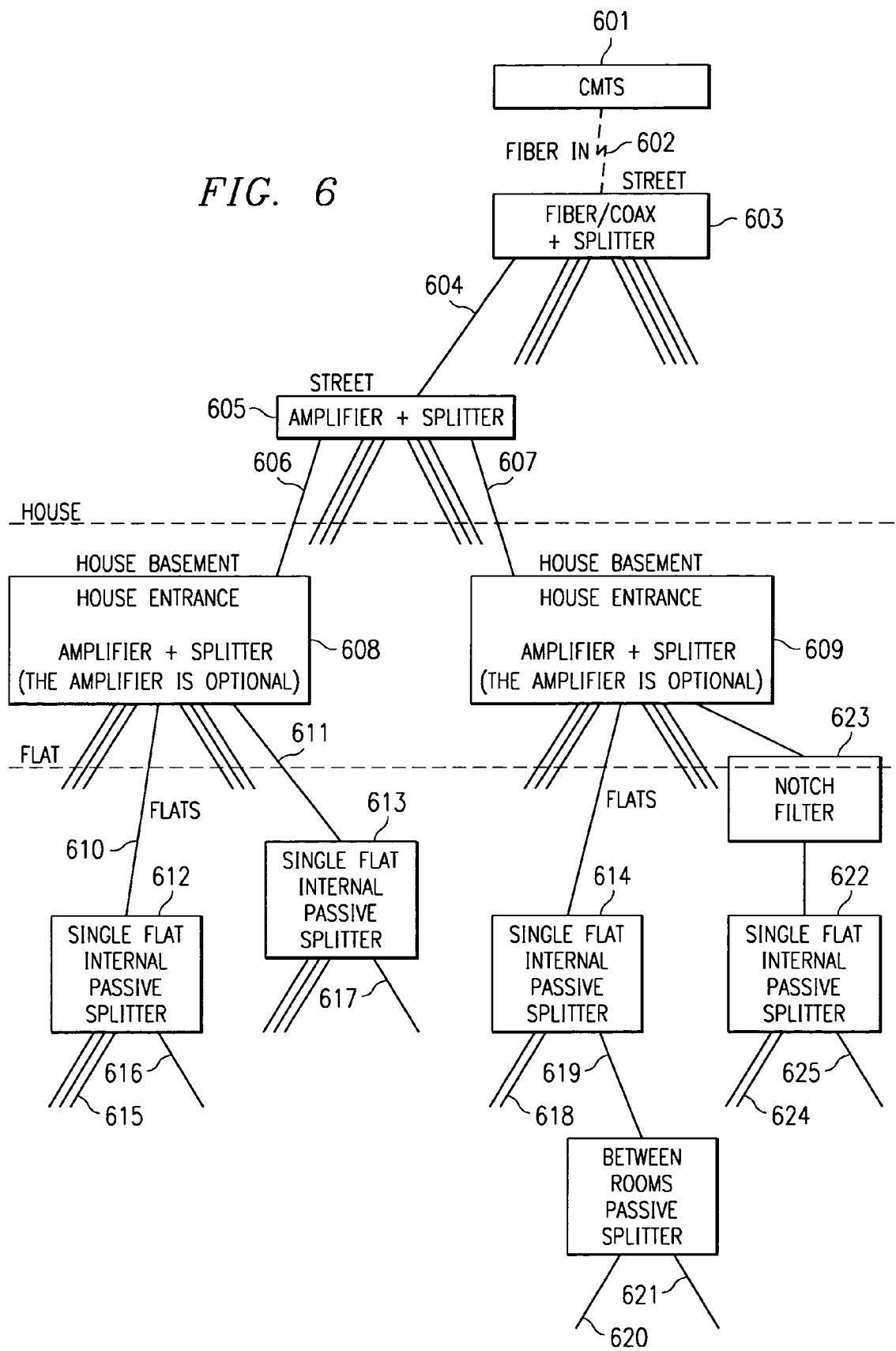
FIG. 6 shows an HFC infrastructure.
Figure 8:
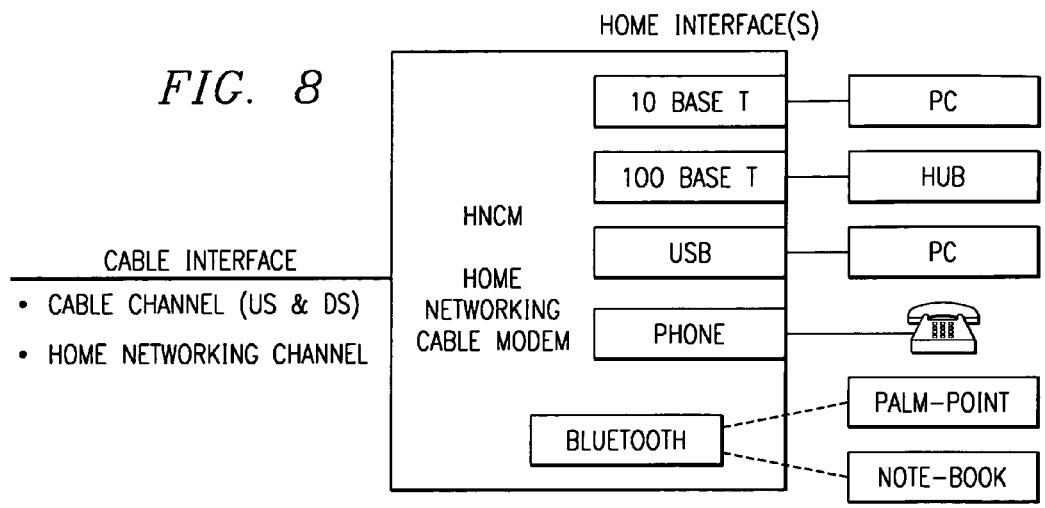
FIG. 8 shows HCNM interfaces.

Following some typical calculations based on FIG. 6 and table 1. These calculations are based on a system that does not include notch filter.

Data Form 2: Typical Loss Between Two Apartments

Loss between two apartments

| 1 Loss between two modems in the same flat sharing the same splitter [from 615 to 616]: | | |
|---|---|---|
| Wires [meters] | 20 | 4.2 |
| Splitter Isolation (n = 4)[612] | | 25 |
| Total [dB] | | 29.2 |
| 2 Loss between two modems in neighbor homes [from 615 to 617]: | | |
| Wires [meters] | 44 | 9.24 10 m[home 612] + 2*12 m [flat to basment] + 10 m [home 613] |
| Insertion Lost (n = 4)[612] | | 8.2 |
| Splitter Isolation (n = 8)[608] | | 30 Passive splitter |
| Insertion Lost (n = 4)[613] | | 8.2 |
| Total [dB] | | 55.64 |

Note:

The loss between two modems that required to pass amplifier is more then 60 dB, because the amplifier contains filter for these frequencies for the up stream direction.

The capability to calculate the attenuation between two different flats is important for enabling efficient frequency reuse. The cable operator should do the calculation of the "branches". The calculation of the 'branches' can be done by the following methods:

Numerical Calculations—Calculations that are based on preceding knowledge of the cable operator. The cable operator can do calculations that are based on its network structure and its network components.

Defining Basic Rules—The operator can define some base rules that usually works, and divide the network to branches according to these rules. E.g. (of rules) a. each port that connects directly to a filter/amplifier unit specify a "branch"; b. Homes/flats that are connected using passive filters will be on the same "branch".

Measurements using special equipment—The cable operator can use spectrum measurement equipment.

This equipment will usually be used to enable the cable operator to define the rules according to its own infrastructure.

Measurements using HCNM Branch Calculation Mode—The cable operator can use a specific mode of the home networking equipment that enables 'branch' calculation.

Each HCNM should have a specific mode that enables the management system to calculate each 'branch' member.

This mode contains the following base features:

Lock on a specific frequency, and on a specific frequency range.

Transmit a signal in a specific power for a specific period (The pattern of this signal is known).

Measure the power of the input signal (The pattern and the measurement period are known).

The algorithm is based on the structure of the cable infrastructure. A tree data structure is built in the computer memory. This data structure represents the existing infrastructure.

The tree is built according to the following rules:

Tree nodes are the splitters (the splitters can be active or passive).

The splitter capability to isolate between two sub-trees is saved as data in these nodes.

The leaves are the CM, HCNM or HNO.

The identification of these nodes is saved in these leaves.

The main process is to build the topology database. This process can be done by the following methods:

Load the tree structure from the cable operator database. This process is simple but it required an updated database.

Automatic generation of the tree structure based on measurements of the isolations between two components using the HCNM—Branch Calculation Mode. These calculations are very complex and are based on prior assumptions.

Note:

The base idea in automatic tree building is to calculate the isolation between two leaves. If the some leaves have similar isolation between themselves they can be connected to the same nodes. If there are two leaves with the same isolation, and an additional leave that has a higher isolation this leave connect to the previous two leaves using additional higher level node.

After building the topology database, it is required to verify that the nodes contain the isolation values. These values are usually loaded in the previous stage, but if this information was not entered, the system can use the Branch Calculation Mode to find the isolation of the nodes.

Note:

It is very hard to calculate these numbers when the tree is calculated automatically, and the splitter supplies different isolations between the wires that are connected to the same node.

This 'branch' specification is based on the data structure that was built.

'Branch' is specified by the isolation between this 'branch' to the other "branch". This isolation enable the systems in two different 'branch' to use the same frequency without (or with negligible) interference.

A 'branch' is defined by specifying a threshold of the minimal isolation between this 'branch' to the other 'branches'. When the isolation value in the tree nodes (or in summary of some layers that does not include leaves) is greater than the specified threshold all the nodes that are member in the specified sub-tree will be defined as nodes in a specific 'branch'.

Notes:

When the system is not occupied as a balanced tree, the 'branch' calculation might be less effective. In this case, it might be required to divide the frequency range to some sub-ranges, and define a 'branch' for each one of them. The algorithm for these calculations will not be specified in this document, because we do not think that the common network includes such complex structure.

The operator can add filters or special splitters to reduce the branches' size.

To use the Single Home operation mode that simplifies the equipment, a notch filter should be added. This filter can be added in the following points:

Adding a filter at the flat/single user home entrance.

The advantage of this method is the ability of the end user to add the filter by himself.

Replace the house basement splitter that split the signals between the flats to a special splitter.

The advantage of this method is the ability of the MSO to change a single splitter to a special splitter that includes internal filter. This splitter enables more effective usage of the home networking for some flats (homes).

The disadvantage of this method exists only if the HomeCN uses the notch filter reflection. In this case the attenuation and the delay of the coaxial wire between the flat to the central splitter. This influence is usually negligible.

The attenuation between two points at home (and the range of these values when there are more than two points) dedicates the quality of the equipment that should be use for HomeCN.

Figure 7:
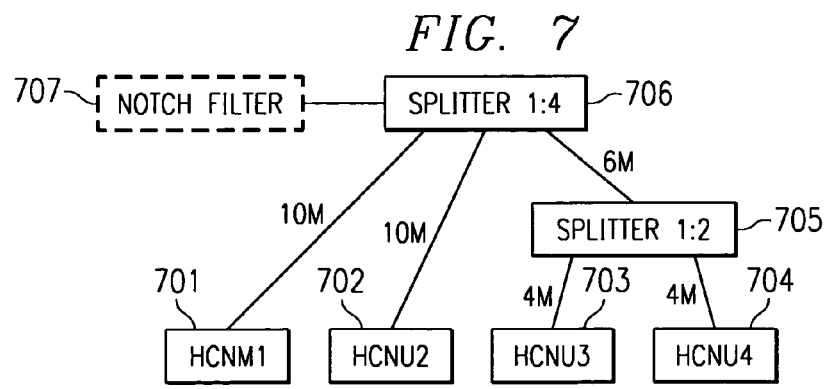
FIG. 7 shows a network with a notch filter.

There are some RF challenges in designing the HomeCN components:

The "hidden nodes" problem:

This "hidden nodes" might exist when the isolation difference between two different nodes is different than the isolation between other two nodes. This problem usually exist in a home that contains some splitters no notch filter.

i.e. if there are some HCNU the attenuation between two of them might be low, and between each one of them to the $3^{rd}$ might be high.

e.g. FIG. 7: the communication between 703 and 704 might be 'hidden' from 701 in particular when the notch filter [707] does not exist.

High reflection

The reflection from the notch filter is in the power of the signal or it might be higher. When this reflection is higher than the signal we can use this reflection as our main signal.

The following calculations are based on table 1 and FIG. 7. These calculations are only valid for homes that have notch filter.

Data Form 3: Home Networking Typical Calculations
Loss Between Two Modems in the Same Flat

| 1 Connected to the same main filter HCNM1 [701] HCNU2 [702]: | | | | |
|---|---|---|---|---|
| Without Notch Filter | | Echo from the notch filter | | |
| Wires [meters] | 20 | 4.2 | Wires [meters] | 20 | 4.2 |
| Splitter Isolation [706] | | 25 | Insertion Lost (n = 4)[706] | | 8.2 |
| | | | Return Loss [707] | | 10 |
| Total [dB] | | 29.2 | Insertion Lost (n = 4)[706] | | 8.2 |
| | | | Total [dB] | | 30.6 |

| 2 Connected to the same minor filter HCNU3 [703] HCNU4 [704]: | | |
|---|---|---|
| Through the nearest splitter | | |
| Wires [meters] | 8 | 1.68 |
| Splitter Isolation[705] | | 22 |
| Total [dB] | | 23.68 |
| Echo from Main Splitter | | |
| Wires [meters] | 20 | 4.2 |
| Insertion Lost (n =[0 2)[705] | | 4.2 |
| Return Loss [706] | | 11 |
| Insertion Lost (n =[0 2)[705] | | 4.2 |
| Total [dB] | | 23.6 |
| Echo from the notch filter | | |
| Wires[meters] | 20 | 4.2 |
| Insertion Lost (n = 2)[705] | | 4.2 |
| Insertion Lost (n = 4)[706] | | 8.2 |
| Return Loss [707] | | 10 |
| Insertion Lost (n = 4)[706] | | 8.2 |
| Insertion Lost (n = 2)[705] | | 4.2 |
| Total [dB] | | 39 |

| 3 Connected to different filters HCNM1 [701] HCNU2 [704]: | | | | | |
|---|---|---|---|---|---|
| Without Notch Filter | | | Echo from the notch filter | | |
| Wires [meters] | 20 | 4.2 | Wires [meters] | 20 | 4.2 |
| Splitter Isolation [706] | | 25 | Insertion Lost (n = 4)[706] | | 8.2 |
| Insertion Lost | | 4.2 | Return Loss [707] | | 10 |
| (n = 2)[705] | | 33.4 | Insertion Lost (n = 4)[706] | | 8.2 |
| Total [dB] | | | Insertion Lost (n = 2)[705] | | 4.2 |
| | | | Total [dB] | | 34.8 |

Note:

The CSMA/CA can be used with or without ACK protocol. The need for immediate ACK should be verified according to the quality of the infrastructure.

The security is only required in Connected Home operational mode.

The security that is required in this protocol is the base on IEEE 802.11 or on line privacy plus. The specification for line privacy plus protocol is presented in DOCSIS 1.1.

The management of the security keys can be done by the CMTS.

Note:

Home networks that works in connected home operational mode and are not connected to the CMTS will use a single key.

The priority is integrated in Layer two MAC.
A HCNM has at least two physical interfaces.
HCNM interface to the cable side.
This single physical interface contain two data channels (that use different frequencies):
1. Cable Modem Channel.
The cable modem channel (e.g. DOCSIS), containing two sub-channels: up stream channel (US) and down stream (DS) channel.
2. Home Networking Channel.
The Home Networking channel (a single channel that is used for sending and receiving information).
HCNM interface to the home side—Home Interface.
The home interface might be a single interface or it might contain some interfaces. This/these interface(s) are connected to the equipment at home. This/these interface(s) can be Ethernet (10/100/1G BaseT) (or some Ethernet ports), USB, Phone connection, Bluetooth, wireless, or other.

Notes:

The HCNU and the HCNI components do not contain the Cable Modem Channel. Except HCNI that designed as host-based, i.e. a card that inserted into the PC and connected to the PCI bus, in this special case it might implement the HCNM functionality.

The HCNM gets the information from these channels/interfaces simultaneously.

The HCNM bridges messages between the home interface to these cable channels and vice versa. In addition it might support the capability to bridge information between cable modem channel to the home-networking channel and vice versa (This capability is only required when HNO components exists).

The following table describes the bridging requirements for HCNM:

| Bridging Type | Description |
|---|---|
| Cable Modem Channel-Home Interface | According to cable modem standard's specifications. |
| Home Networking Channel-Home Interface | Bridge the messages between the stations at the home networking and the stations that are connected to the HCNM home interface(s). |
| Cable Modem Channel-Home Networking Channel | Bridge the messages between the Cable Modem Channel and Home Networking Channel in the following conditions: This component was configured to do Cable Modem channel-Home Networking channel bridging; and |
| | The message should be transferred between Cable Modem Headend system and HNO component. |

Figure 9:
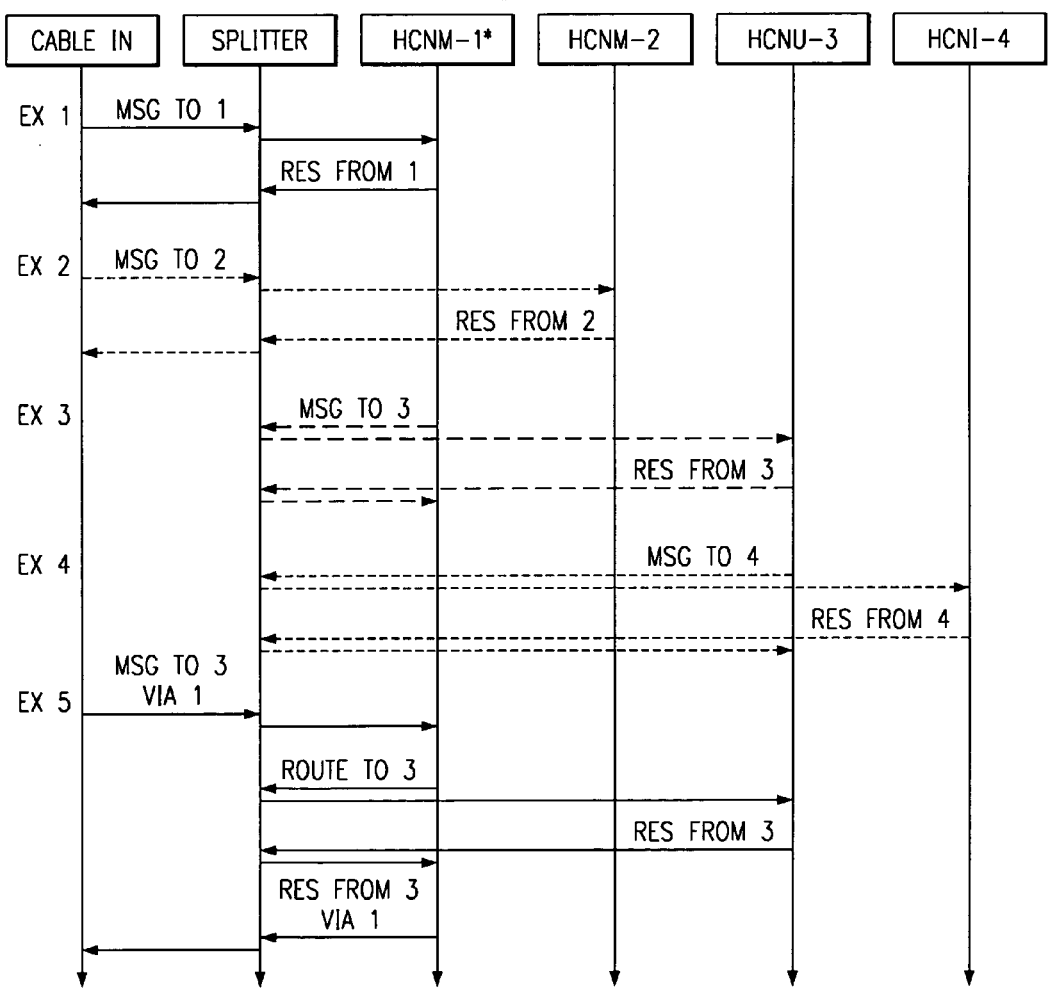
FIG. 9 shows representative HCN data flows.

FIG. 9 presents some examples of data flow.

Ex.1 and Ex.2: Message from the Cable headend to component no. 1 or component no. 2; and the returned response. These examples present a standard cable modem protocol.

Ex.3 and Ex.4: Message from the one component in the home network to another component in the home-network (1 to 3; 3 to 4) and response. The messages from the home equipment is transferred to the splitter, the splitter distributes the energy to the Cable In connector, and to the other output connectors that are connected to the splitter. The destination-component gets the message and returns the response.

Ex.5: Message from the Cable headend to component 3 through component 1 (that was specified as the front router of the components that exist only in the home networking). The message is arrived to HNCM no. 1, it identifies the destination and its duty as router, and it routes the message to HCNU no. 3. The response is transferred in the opposite way. (Note: if HNCM no. 1 fails, HNCM no.2 can be configured to take its duty automatically).

The purpose of the home networking system is to transport Internet Protocol (IP) traffic through the HomeCN system.

The Network Layer protocol is the IP [RFC-791].

The home networking management can be done by two methods:

Local management that is done at home.
This method is always used in the Single Home operation mode.
This option can be done when the house is not connected to the cable infrastructure, or when the house has isolation (for the home networking frequency) from the cable network and the headend does not support the home networking management capability.
Local management might not include all the capabilities that the central management supports.

Central Management

Management from the headend that is done by the cable operator.
This option is the preferred method for connected home operational mode. This method used the standard cable modem interface (e.g. DOCSIS interface). The configurations of the HCNU and HCNI can be done by the headend via HCNM routing capabilities.

Figure 10:
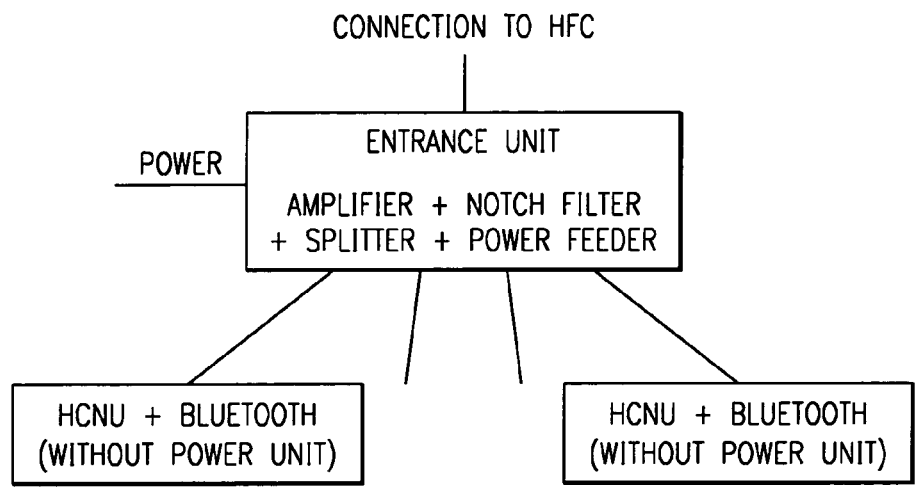
FIG. 10 shows a power supply.
Figure 11:
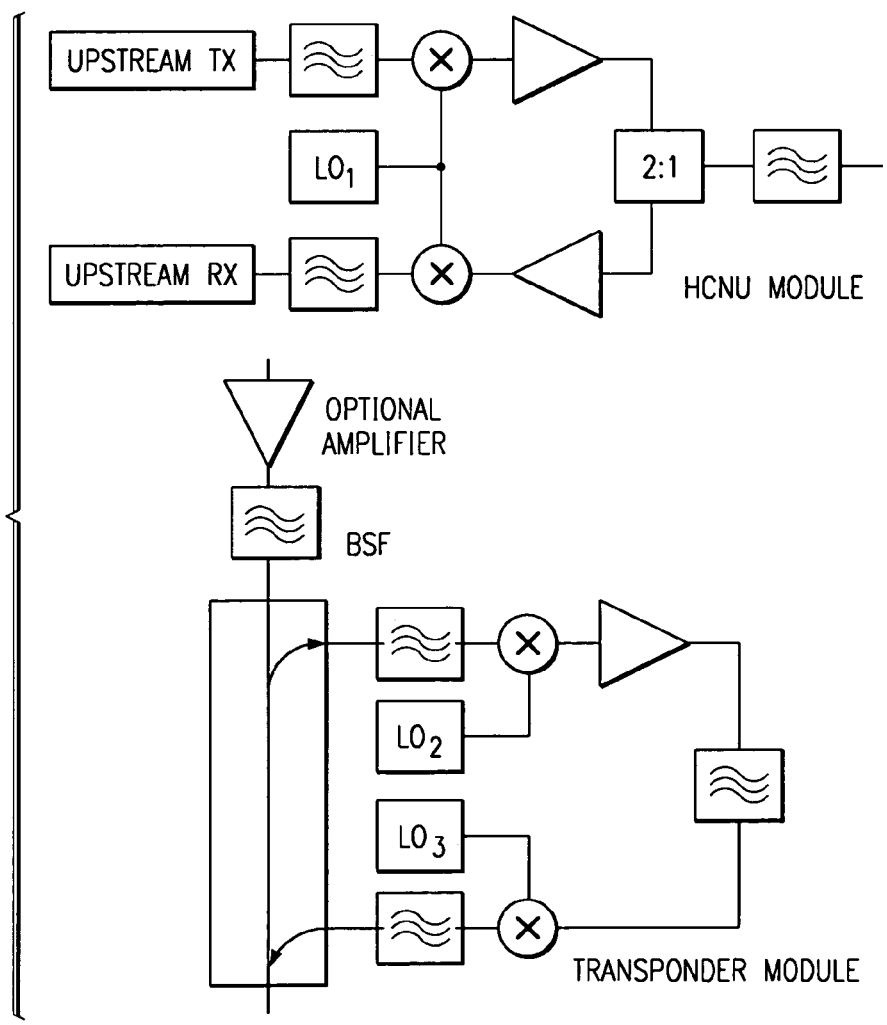
FIG. 11 shows a dual frequency architecture.
Figure 12:
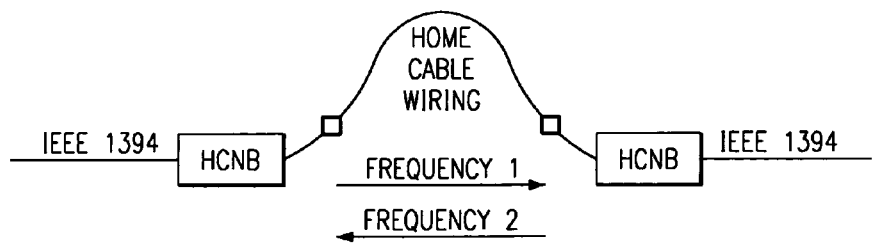
FIG. 12 shows dual frequency components.

There are some options for power supply to the HomeCN units. Most of the HomeCN components will use local power supply. The special unit is a HomeCN component that its only interface is wireless (i.e. Bluetooth). For this type of unit, that requires very low power consumption, a central home power supply can be added. The central power supply is a special HomeCN splitter that contains inside the following sub units: Notch filter, a passive splitter, and a power supply that enable units to gets its power from the home cable infrastructure (see FIG. 10).

The present invention provides home networking solutions that utilize the in-home TV wiring, supplying high rate connectivity between any two home networking nodes. The present solution does not load the city cable TV (CATV) network.

The present invention enables installation of modems, connected to different types of nodes of the CATV to enable communication between these nodes.

The present invention presents a solution of transferring the data between these nodes, when the data is not required to be transferred to the headend.

The present invention presents a low cost solution, which is very important to enable a solution to the mass market.

While Local Area Networks (LANs) constitute a well-accepted part of the communications environment for businesses, LANs infrastructure is not commonly deployed in the home. This is due to several technical and logistical reasons.

The major driving force behind creating new home connectivity products is the growing number of homes with two or more PCs.

In the prior art, home networking systems are designed using the existing copper-based (twisted pair) wiring or using wireless solutions. The present invention seeks to provide system and apparatus for designing home networking over the in-home TV wiring, used to connect the antenna or the cable TV to the TV sets in the home.

The following key applications drive the demand for home networking:

Internet Sharing

Sharing simultaneous access to the Internet is a major driving factor for home networking. Today, when multiple home users want to enjoy Internet access without constraint, separate telephone lines and Internet accounts are required. Since this is costly, multiple users are typically restricted to using the Internet one individual at a time. Home networks can deliver significant savings and greater utility by enabling shared access to a single Internet connection. The need for this shared access will grow as today's 28.8K, 33.6K, and 56K analog connections are replaced by higher-speed "always-on" connections such as cable modem, Universal ADSL, ADSL, or satellite. Standardizing on a high-speed local-area home network interface insulates installed home networked devices from changes in Internet access technologies.

Peripheral Sharing

Today, in a home with multiple PCs, each computer needs a duplicate set of peripherals, such as printers or scanners. With a home network, the limited budget can optimize for one higher-end shared peripheral rather than many low performance units. With a network standard for the home, future peripherals can be designed to connect directly to the network, simplifying installation.

File and Application Sharing

Multiple users can easily share applications, move files, or back up data, saving time and money. Automatic software updates are enabled by a network connection.

Other Applications Enabled by Home Networking:

Entertainment

Easy-to-use home networks will also enable popular multi-player network games, either within the home or over the Internet.

Home Automation

A ubiquitous, easy-to-install home network will also foster home automation applications, such as environmental control and security systems.

Voice and Video over IP

New digital voice and video services are being introduced into the home. All these digital services—whether data, voice, or video—need to be accessible anywhere in the home by any device. All digital devices, including PCs, digital televisions, and digital telephones, will require a high-speed connection to the home network.

Today, it is estimated that over 15 million of the 100 million homes in the United States have two or more PCs, and 60% of new consumer PC purchases are by families that already have at least one computer. This number is expected to double by the year 2000.

Chief among these is the fact that the widely adopted and supported enterprise networking technologies require a technically skilled individual capable of designing and maintaining complex network architecture. Enterprise networks also require the use of high-grade wiring typically not found in most homes.

Also, few home users are willing to master the art of installing and maintaining an Ethernet repeater, learn even the basics about network protocols, or drill holes through their walls to run new network-capable wiring throughout their home.

Success in the consumer market requires that a home networking technology be inexpensive, easy to install, and easy to use. To be truly effective and embraced by consumers, a home networking solution must meet these criteria:

1. No new wiring.
   Most existing homes are not wired for traditional networking equipment. Rewiring the home is too expensive and a hassle for most consumers.
2. Simple to install and use.
3. Must be low cost to allow the mass market to enjoy the benefits of home networking.
4. The range must be adequate to operate within a typical home.
5. Support high data rate.
6. The networking capability must grow with user applications without obsoleting existing devices.
7. The network must be secure.
   The network data must remain private; it must not be accessible to neighbors or anyone outside the home.
8. The solution must not interfere with other systems, appliances and services.

Requirements:

1. The home networking equipment coexists with the other services on the cable network. In particular,
   It is spectrally aligned with any combination of television and other signals in the cables; and
   It does not cause harmful interference to any other services that are assigned to the cable network in spectrum outside of that allocated to the home networking. Therefore,
   The solution should not interfere with the TV/video channels.
   The solution should not interfere with any cable modem channels.
2. Comply with the general home networking requirements.
3. Verify that the technology does not limit the number of cable modems or the number of home networking modems. Due to using HCNM technology, each home will include more than a single CM. It is required that the cable headend will support the increased amount of CM's. For example DOCSIS protocol can support high quantity of CM's (up to 8,000 CM's for a MAC chip) in particular DOCSIS 1.1.

4. The Home Networking (HN) is required to supply a scaleable bandwidth range (100 Kb–10 Mb and more).
5. The number of nodes that are connected to the home network should not be limited by the presented solution. The only limitation should be the identification method in layer two (e.g. the limitation of using MAC address).
6. The connection method and the connection rate from home to the Internet using any technology (e.g. xDSL, cable modem) should not be influenced by the home networking technology.

The only difference may be the ability to use this Internet connection for central management. For example, the Ethernet protocol, as a home networking protocol, complies with this requirement. It does not create any limitations to the protocol that is used for connecting the home to the Internet. The HomePNA is a home networking protocol that adds limitations and does not comply with this requirement. HomePNA enables the G.Lite protocol to be used for connecting the home to the Internet, but it does not enable the use of ADSL (10 Mbps) or VDSL protocols because it uses the same medium (phone line) and the same frequencies.

7. The ability to create a component that supplies the functionality of home networking and the functionality of connection to the Internet.

Nice to have:
1. The ability to create a component that supplies the functionality of home networking and does not supply the functionality of connection to the Internet.
2. Home Networking might be able to operate without connection to the headend.
3. An important point is to define this protocol to use limited "cable" resources.
   It should not use the limited US (up stream) frequencies. It can use some of the DS (down stream) frequencies or higher frequencies (even if their distance is limited).

There are some advantages in using this solution:
No new wiring is required. Usually there are some ports of the TV cable in each home.
The capacity of data that can be transferred using this infrastructure is very high.
There is no radiation. Wire radiation is very low, in particular Coax wires radiation is negligible. (Compared to wireless solutions this point is very important).
Simple to install and to use.
It can be low cost to allow the mass market to enjoy the benefits of home networking.
Supply high data rate.
It enables a secured network. The network data can remain private; the information can not be accessible to neighbors or anyone outside the home.
The range limitation is negligible compared to the typical home.
The networking capability grows with user applications without making the existing devices obsolete.
Total isolation from the home network to the cable infrastructure (filters) can be added, although it is not required.
It uses the same infrastructure that is used today by the current entertainment equipment (e.g. TV, Video). Therefore, the cabling probably exists. Supporting this protocol only requires minor changes in the equipment.

The advantages of using the cable infrastructure:
No new wiring is required. Usually there are some ports of the TV cable in each home. These ports are usually located in the appropriate location, because one of the major aspects of home networking is to connect your TV environment (that already has some interfaces to the cable infrastructure) to the computer environment (that already has an interface for the current cable modem).
The capacity of data that can be transferred using this infrastructure is very high (Order of Gbps).
There is no radiation. Wire radiation is very low, in particular Coax wire radiation is negligible. Compared to wireless solutions this point is of great importance. The coax cables are also not sensitive to external radiation.

The two-frequency mode exists to eliminate the echo problem that exists in some of the homes in the single frequency mode. The method is transmitting the information is a specific frequency range (e.g. 900–906 MHz) and receiving the information in a different frequency range (e.g. 910–916 MHz). The architecture of this solution appears in the following figure.

In the single frequency mode the information that is transferred from HCNU-2 to HCNU-3 is transferred through Splitter-I and in addition and echo from Splitter-main also received.

In the Dual Frequencies Mode the Transponder module is required to be added in the entrance to the home. The signal from HCNU-2 is transferred to the transponder module. The transponder module changes the signal frequency from the US frequency to the DS frequency and transmits it to the home. The HCNU-3 received this signal with no echo.

The transponder is a simple one that translates the input frequency to another, whether if it is with an up and down conversion or other technique such as conversion to baseband and back.

The HCNU can support the two modes, and according to the configuration the operation mode will be specified. The configuration can be done manually or automatically by verifying if the transponder exists (by sending a signal in the US channel and verifying if the signal arrived in the DS channel).

Therefore this module can be inserted in houses where there is a problem with reflection.

There are some additional benefits in the two-frequency mode:
The transmission path has low insertion loss and negligible reflections.
The transponder module can be inserted with the notch filter and with an amplifier.

Note:

The transponder can be powered down (even remote) and the system returns to the initial model, this ability maybe very important to the cable operator.

This section describes other applications that can be operated using the same physical layer.

These applications are a group of applications that can be built on the same infrastructure, transporting of variety classes of layer two protocols through the home cable infrastructure. These applications are based on home networking layer one that is described in this document, and used the specific application layer two.

The HomeCN-P is a protocol that includes layer one and two. There are two options to transfer different layer two over this infrastructure:

To transfer different layers two using the same layer one. This method is used in the presented application.

To transfer different layers two over the layer two of the HomeCN-P. This method is not used in this presented solution because the capacity and the delay are not good enough for the presented applications.

Following some examples of layer two protocol that can be used:

USB
IEEE 1394 (fire-wire)
Ethernet (10BaseT, 100BaseT)
Wireless

This system enables high rate connection between two points at home.

The system contains two Home Networking Bridges (HNB) that are connected through the home cable wiring, each one of them has the same layer two interface e.g. IEEE 1394.

The system structure is presented in the following:

This structure enables information sending in very high rates (e.g. 40 Mbps) for each direction.

Note:

This system does not required burst modulator/demodulator. It can use a "standard" one.

The Bluetooth technology is design to supply connectivity of components that are located in the same area. The distance between the components should be less than meters (This range probably does not include wall interference). When you build your home network, and your home is larger then a small flat. You need to connect component when the distance between them is larger then 10 meters.

The idea is to build a network at home that connects the Bluetooth sub-networks.

Advantages

The benefits of the Bluetooth connectivity can be used.
You can cover much larger range.
The location of the cable infrastructure port in the room is going to be less important because all the room is "covered" (connected) by the network using Bluetooth connectivity.
The Bluetooth CM can be very simple, and cost effective.

Disadvantages

Adding Home Networking protocol that connects all the sub-networks of Bluetooth is required.
You have two types of networks at your home.
The rate of Bluetooth is less than 1Mbps. If a higher capacity is required, an additional connector type should be added (HomeCN-P capacity is 10–50 Mbps). This additional type might make your network more complex, and will required an appropriate network management.

Figure 13:
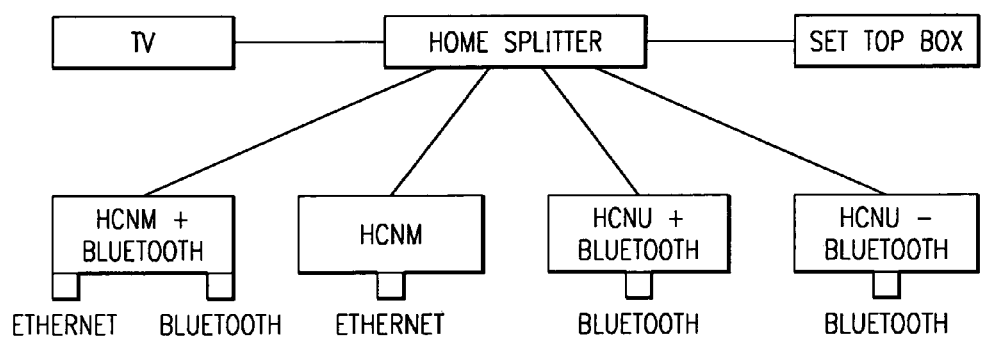
FIG. 13 shows layer 2 transport.
Figure 14:
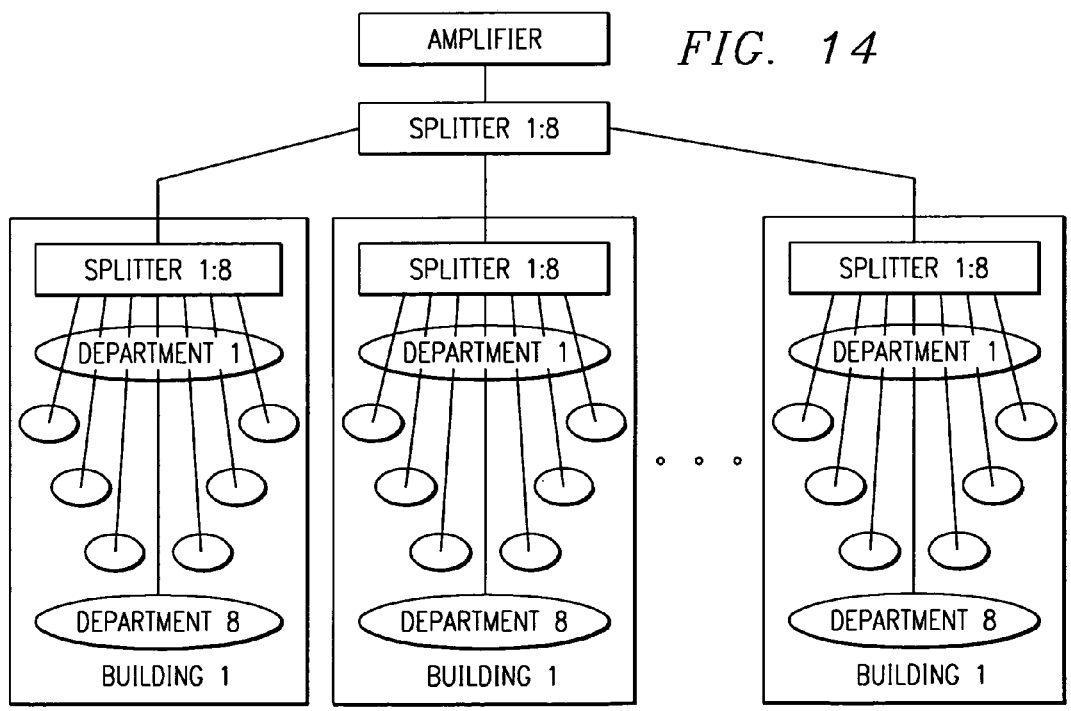
FIG. 14 shows a Bluetooth home network.
Figure 15:
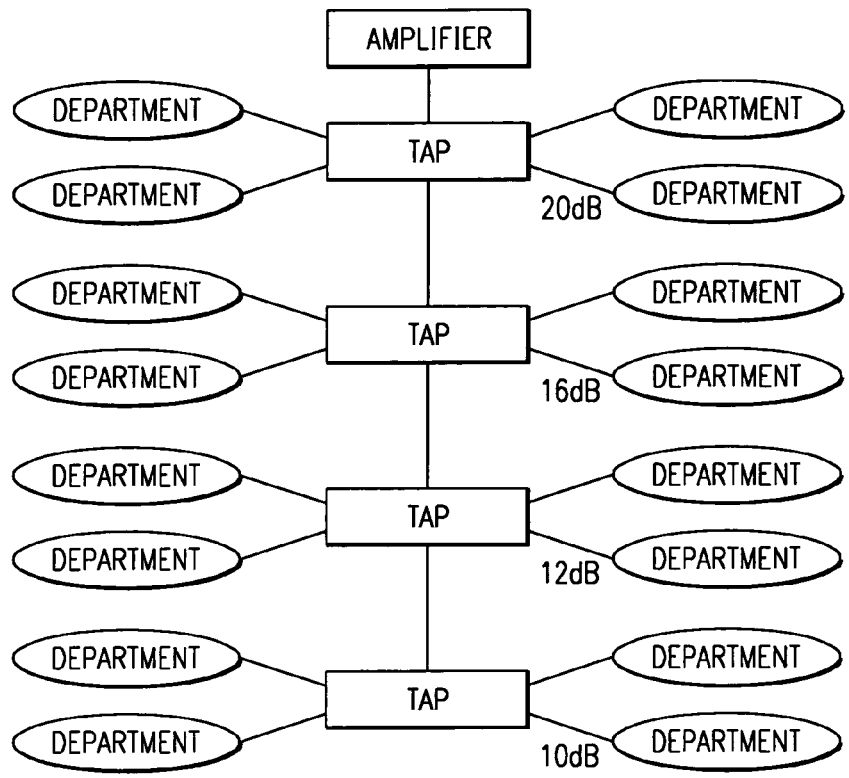
FIG. 15 shows neighborhood wiring.
Figure 16:
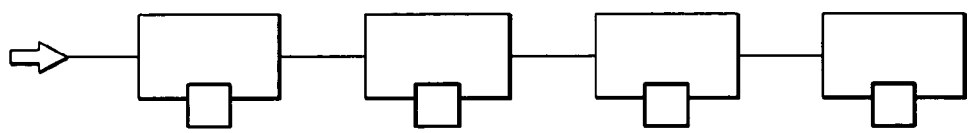
FIG. 16 shows building wiring.
Figure 17:
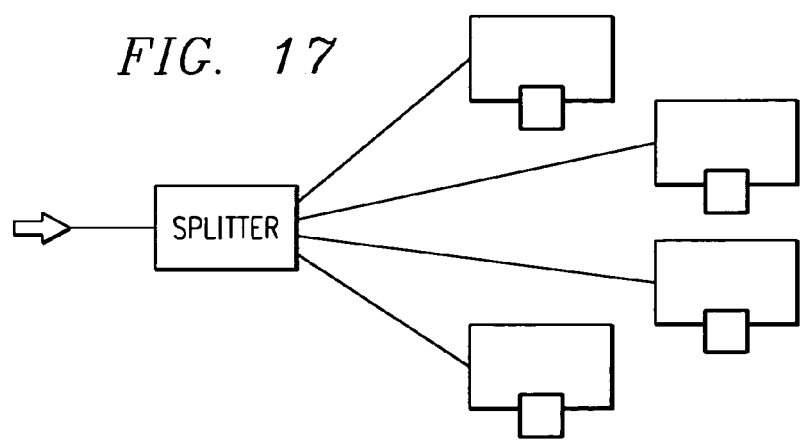
FIG. 17 and FIG. 18 show home wirings.
Figure 18:
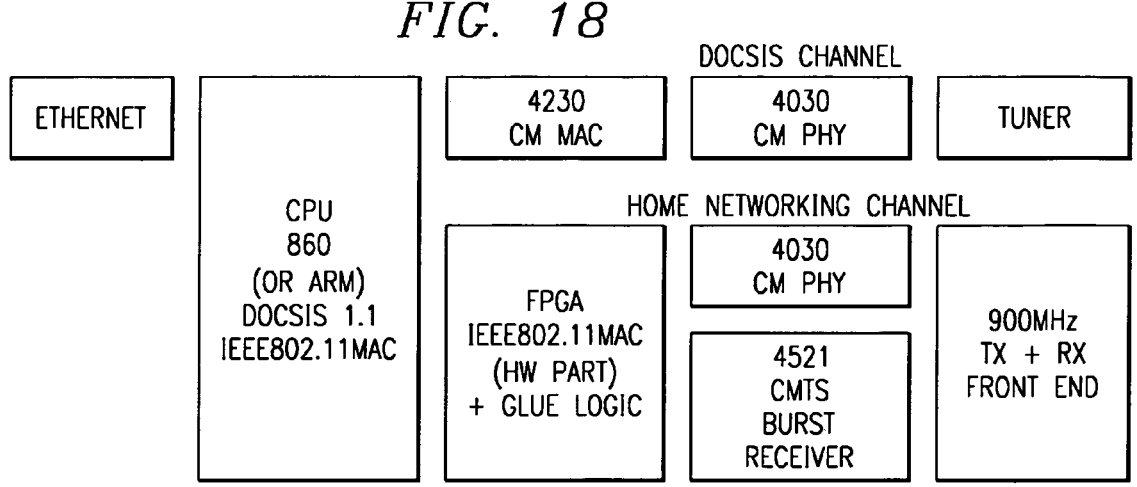
Figure 19:
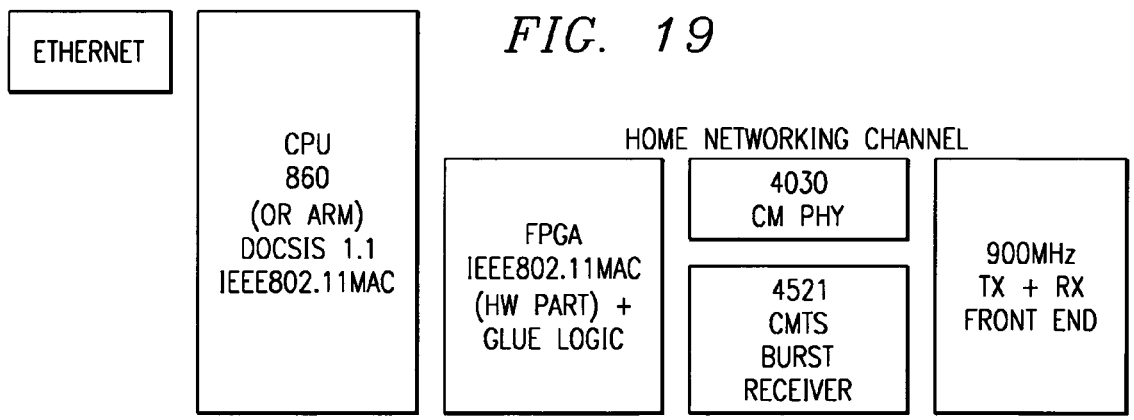
FIG. 19 depicts examples of an HCNM and HCNU.
Figure 20:
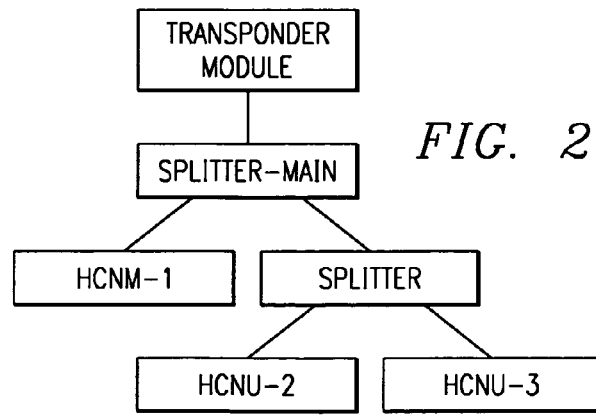
FIG. 20 shows a home networking two-frequency mode architecture.

Notes:

FIG. 13 present an example of a network.
The HNO-Bluetooth can be a very simple component if the network is required to have at least one component of HCNM+Bluetooth that has the capability to manage the simple HNO-Bluetooth components.
The management of the Bluetooth sub-networks and the ability to transfer the connection of a network element from one Bluetooth sub-network to another required a specific layer two Bluetooth rooming-in protocol.
Adding Power-supply capabilities to the home amplifier enable very simple Bluetooth-CM component. Bluetooth-CM component is required to include the following: Tuner, CM-chip, Bluetooth-chip, and very small CPU (only is the CM-chip and the Bluetooth-chip does not contain CPU). The installation procedure is going to be very simple, Just plug it to the cable interface, no other wire are required. The BOM of this component is going to be very low.

When the system is working in a single home operational mode and a notch filter exist, all the management is done local and the requirements from this management system are reduced.

When the system is working in a Connected Home operation mode, and the system contain a CM channel, the management is done from the headend. This management is much more complex.

The following table presents the management functionality:

TABLE NNN

Management Functionality

| Functionality | Description | Operation Mode (ALL or Only-Connected Home) |
| --- | --- | --- |
| HCN units identification | Identify all the units that are sharing the same HCN | All |
| Ranging | Ranging between each two modems | All |
| Headend management | Enabling management from the headend. | Only-Connected Home |
| Frequency Selection And frequency plan | Select the required frequency for HCN and the required frequency range | Only-Connected Home |
| Security | Management of the BLP (Base Line Privacy) keys | Only-Connected Home |
| Support branch Calculation Mode | Support the ability to measure the signal amplitude according to the command of the headend | Only-Connected Home |

The following section describes the frequency planning mechanism.

The configuration for the specific frequency will be done by the management system. The calculation is based on the 'branch' calculation, because the process of frequency allocation is done separately in each "branch".

The following are base rules that are used in the calculation of each home-network frequency- range.

The home-network frequency-range is specified by the required home-networking bandwidth. The required bandwidth is specified for each home-network separately.

E.g. the required home-network frequency-range to transfer 40 Mbps is 6 MHz.

The total frequency-range is specified by the capability of the home networking equipment.

E.g. the total frequency-range can be 40 MHz.

The total frequency-range should be larger than the summaries of the home-networks frequency-range of all the home-networks that exist in each "branch".

If this condition is not met, the cable operator can decrease the bandwidth of its customers, or divide the network into smaller "branches".

E.g. If a 'branch' contains 16 flats and each one of them asks for the higher bandwidth and the total frequency-range is 40 MHz, each one of the flats can get 40 MHz/16=2.5 MHz home-networks frequency-range. The operator can also divide the total frequency-range in other method, 4 flats will get 5 MHz each, and the other 12 flats will get 1.6 MHz each.

There are some frequency-ranges that might be used.

The preferred frequency range is higher than 860 MHz.

Note:

There are some existing chips (low price) that supply two-direction filtering and tuner functionality for the specific 900–1000 MHz frequency-range (Note: These chips were designed for the cellular market).

The following table presents the comparison between these frequency-ranges.

| Frequencies Range | Pros | Cons |
| --- | --- | --- |
| <5 MHz | Not used by DOCSIS and by the TV. Tuners are not required. Low attenuation of the Coax Cable enables low power. | The capacity is very low. The quality of this frequency-range is low. The cable network contains amplifiers for part of this frequency-range. These amplifiers are designed to amplify in the US direction; therefore the segmentations to 'brunch' are limited. Low attenuation of the Coax Cable increases the 'branch' size. |
| 5–42 MHz | Tuners are not required. Low attenuation of the Coax Cable enables low power. | The DOCSIS channels use this frequency-range. The frequency-range resource is very limited. The cable network contains amplifiers for this frequency-range. These amplifiers are designed to amplify in the US direction; therefore the amplifier may be saturated. Low attenuation of the Coax Cable increases the 'branch' size. |
| 42–88 MHz | Not used by DOCSIS and by the TV, these rates are the gap between DOCSIS US channels to TV channels and DOCSIS DS channels. | This range is not free all over the world. For example, in the DEVIC standard this range is reduced. The cable network contains amplifiers for part of this frequency-range. These amplifiers are designed to amplify in the US direction; therefore the amplifier may be saturated. |
| 88–860 MHz | The standard tuner can be used. The capacity is not limited. There is good isolation between different home segments; therefore, 'branch' separation can be used. | The TV channels and the DOCSIS channels use this frequency-range; therefore the cable companies probably prefer to use this resource for the TV channels and DOCSIS channels. |
| >860 MHz | Not used by DOCSIS channels and by the TV channels. There is a good isolation between different home segments, due to the non-matched impedance ($Z_0$). There are some existing chips (low price) that supply two-direction filtering and tuner functionality. | The attenuation is high; therefore there are some distances limitations in very high frequencies. (Note: The distance limitation is not relevant to home networking). There are some FCC limitations. These limitation probably not relevant for coaxial wires |

Various types of modulation can be used.

The modulation method should comply with the following requirements:

Can be used in the required frequency range.
Should support high bandwidth rate (more then 10 Mbps).
Should support bursts with short learning time.
The selected modulations that comply with these requirements are QPSK and QAM.

The Channel Allocation method should be FDM—a specific frequency for each home network. This chapter describes the Design Considerations.

There are some alternatives for channel allocation. The mechanism of channel allocation should answer the problem that a sub-network("branch") usually contains some home networks. The number of home networks that should use the same frequency range can be changed according to the physical layer condition i.e. according to the 'branch' size.

There are some known methods to allocate channels for each home-network. The following table compares between them. This table does not present methods that are a combination of two base methods, because these combinations are not required (e.g. combination of FDM and TDM) in our simple problem:

| Method | Pros | Cons |
|---|---|---|
| FDM-Frequency Domain Multiplexing | Simple The frequency range can be updated according to the number of home-networks that share the same frequency, and according to the required bandwidth. Can use wide spectrum for the whole solution, when each home is required to use narrow range (less then 6 MHz). Very efficient, in particular when the number of home-networks in a specific 'branch' is low. Does not require synchronization and does not require CMTS for synchronization. | Not efficient in case of many home-networks on the same "branch" According to our estimations, this case is probably rare. CBR based; therefore it is not affective when the traffic is not CBR type. |
| FDM with frequency hopping | Does not require any configuration. I.e. not required configuration of the frequency that each home should use. Very efficient when the traffic is ABR type. | More complex then FDM. Hard to be managed by the Cable Operator. It is not efficient when the traffic is CBR type (e.g. digital movie playing on the DVD in the living room, when the TV is in the bad room). It has only disadvantage when the home is the only home on the branch. |
| TDM-Time Domain Multiplexing | The bandwidth allocation can be dynamic-according to the needs. | Requires synchronization, therefore, it require CMTS for synchronization. Can not use the wide spectrum (more then 10 MHz) in each channel group. Making Home Cable Networking Unit (HCNU) equipment is very complex, because this equipment is required to get the sync from the cable modem network. It is similar to FDM, but more complex, when the home is the only home on the branch. |
| CDM-Code Domain Multiplexing | The supplied bandwidth (data rate) can be dynamic-according to the needs. | Very complex Requires synchronization, therefore, it requires CMTS for synchronization. Making Home Cable Networking Unit (HCNU) equipment is very complex, because this equipment is required to get the sync from the cable modem network. Can not use wide spectrum (more than 10 MHz) in each channels group. The performances are low unless you are using complex equipment that supports wide spectrum sampling. It is similar to FDM, but more complex, when the home is the only home on the branch. |

The data link protocol should be the IEEE 802.11 MAC layer CSMA/CA.

Note:

The CSMA/CA can be used with or without ACK protocol. The need for immediate ACK should be verified according to the quality of the infrastructure.

Following the design considerations:

There are some options to define the layer two (data link) protocol.

The major aspects that should be considered are:
- The number of stations that use the home networking is variable (usually 2–15).
- Station can be added to the network or removed from the network during the home network operation.
- Collision prevention is required, because collision detection in the QAM technology is complex.
- It is preferable that all the components will be similar, so that the home network will not require a special head component.
- This method usually increases the robustness of the network, and does not require special addition of equipment.
- A standard protocol or protocol that is close to a standard protocol is preferred.

There are some protocols that comply with these requirements, following two examples:

The 802.11 MAC layer CSMA/CA.
- This protocol is used today by many vendors, usually, in the wireless LAN equipment. Consider the fact that Bluetooth interface might be required to exist on the HCNM/HCNU/HCNI components, it would be much simpler to support a single MAC protocol. This protocol also supports priority.

The Token Bus 802.4.
- This protocol is not common, and it is very complex. Building a reduced version of this protocol can simplify the protocol, but it will not be a standard protocol.

The system security is done in layer two. This security can be based on to the following standards:
- The DOCSIS standard.
- IEEE 802.11 standard.

The preferred option is according to DOCSIS standard because:
- The CMTS headend already manages this security.
- The standard CM already contains these cores.

Priority should be defined for the two channels separately.

The priority for the cable modem channel:

The need for priority for this channel was investigated. Cable modem protocols such as DOCSIS include this capability for services that require this capability e.g. VoIP.

EXAMPLE

The priority mechanism for the DOCSIS standard is well defined in DOCSIS 1.1.

The priority for the Home Networking channel:

The priority for this channel is divided into two aspects:
- Priority is required in the home-networking channel for applications that are required to be connected to the standard cable modem channel; but they are using the home networking as transport media. The solution for these applications is to use HCNM and not HCNU/HCNI, and to use the cable modem channel directly.
- Priority is required in the home-networking channel for applications at home. E.g. CBR priority for transferring a video from the DVD reader to the digital TV on another floor, high priority for games, low priority for backup.
- The priority requirements for these applications probably will be added soon. But the basic requirements of the home networking does not require priority capabilities, and the data rate of the home networking is high therefore "best effort" is good enough.

According to the presented analyses, specifying the priority for the home networking can be handled in the $2^{nd}$ phase.

The following table compares between the different home networking solutions.

| Subject | HomePNA | HomeCN |
| --- | --- | --- |
| No new wiring | Use the existing phone interfaces small advantage for the number of phone jacks | Use the existing TV cable interfaces Advantage in the location for usage of home networking to entertainment (e.g. TV, VCR, DVD) |
| Installation | Simple to install and use. Does not required any change in the home wiring. | Simple to be install and use. Usually, does not required any change in the home wiring. In some of the cases it required adding a component in the entrance of the home. |
| Notch filter adding | Might be required-depends on the VDSL/HomePNA coexistence. | May be require for low cost equipment, or to enable higher bandwidth. |
| Low cost | The host-based product price is $79 for 1 Mbps (Intel). | The solution can be in similar prices. |
| Range | Adequate to a typical home. | |
| User privacy | Does not require The neighbor can use the cross talk for eavesdropping (intelligence). | Required, only, when the notch filter (or flat amplifier) not exist, and you are afraid from eavesdropping (intelligence) from neighbors that are connected to the same building splitter. |
| Interferes | Interferes with VDSL | No interferes |

-continued

| Subject | HomePNA | HomeCN |
| --- | --- | --- |
| Available capacity | HomePNA 1-1 Mbps HomePNA 2-10 Mbps (This capacity is very difficult to achieve because the home phone wiring is in very low quality. | Single Home low cost version-20 Mbps Higher version can support very high capacity because the coaxial network has very high quality. |
| Integrated into | DSL (G.Lite), Cable Modems? | Uaually-Cable Modems, Bluetooth |

Following some typical Street/Building wiring

The following describes HCNM.

The $1^{st}$ chip is designed to be designed in "system on a chip" architecture. The base chip should support the Single Home operation mode to reduce the price. In addition it requires supplying a Bluetooth interface.

Following the components should exist on the chip: Burst receiver, Burst Transmitter, 900 MHz front end (bi-directional), MAC (based on 802.11) that supports the HomeCN and the Bluetooth, The Bluetooth interface, and CPU core (ARM).

The chip should support only specific the frequencies of 900–906 MHz and transmission rate of up to 30 Mbps.

Note:

This chip might also include Bluetooth core.

| | |
| --- | --- |
| CATV | Cable Television |
| CM | Cable Modem |
| DOCSIS | Data Over Cable Service Interface Specifications |
| HCNP | Home Cable Networking Protocol |
| HCNM | Home Cable Networking Modem |
| HCNI | Home Cable Networking Interface |
| HCNU | Home Cable Networking Unit |
| HomeCN, HCN | Home Cable Networking |

What is claimed is:

1. A method of networking a plurality of devices residing within a home, creating a home network, with a home cable network modem, wherein the devices include TV's, VCR's, PC's, DVD's, DOCSIS cable modems, set-top boxes, wireless devices, Bluetooth stations, cellular phones, and computer games, each device each including a home network interface coupled to an RF element over a coaxial cable, wherein the home cable network modem is also coupled to the RF element over a coaxial cable, and wherein the RF element is also coupled to a cable source, the method comprising the steps of:

receiving a television signal from the cable source at frequencies below a source frequency limit;

operating one of the home network interfaces to transmit a home network signal, in a home network frequency band above the source frequency limit, over coaxial cable to the RF element; and receiving the transmitted home network signal over coaxial cable at the home cable network modem.

2. A method of networking a plurality of devices residing within a home, creating a home network, with a home cable network modem, each device each including a home network interface coupled to an RF element over a coaxial cable, wherein the home cable network modem is also coupled to the RF element over a coaxial cable, and wherein the RF element is also coupled to a cable source, the method comprising the steps of:

receiving a television signal from the cable source at frequencies below a source frequency limit;

operating a cable modem termination system (CMTS) to assign the home network frequency band;

operating one of the home network interfaces to transmit a home network signal, in a home network frequency band above the source frequency limit, over coaxial cable to the RF element; and receiving the transmitted home network signal over coaxial cable at the home cable network modem.

3. The method according to claim 2 wherein the home cable network modem comprises a CATV set top box;

and further comprising:

forwarding the received television signal to a television set coupled to the set-top box.

4. The method according to claim 3 wherein the upstream and downstream home network frequency bands are between 900 and 960 MHz.

5. A communications network comprising:

a cable source adapted to transmit television signals within a frequency range below a source frequency limit;

an RF element, coupled to the cable source, and having a plurality of terminals, and comprising a transponder adapted to calculate branches;

a plurality of devices, each device including a cable networking interface that is coupled to a terminal of the RF element by way of coaxial cable, and that is for transmitting and receiving signals in a home network frequency band above the source frequency limit; and a home cable networking modem, coupled to a terminal of the RF element, for receiving signals transmitted by, and for transmitting signals to, a cable networking interface of one of the plurality of devices in the home network frequency band.

6. The network according to claim 5 wherein the transponder calculates branches by calculating the isolation among the plurality of devices.

7. The network according to claim 5, wherein the transponder is for translating signals received from a cable networking interface of one of the plurality of devices from an upstream frequency range within the home network frequency band into a downstream frequency range within the home network frequency band, and for transmitting the translated signals to the cable networking interface of the others of the plurality of devices and to the home cable network modem.

8. A communications network comprising:

a cable source, coupled to a cable modem termination system (CMTS), and adapted to transmit television signals within a frequency range below a source frequency limit of about 860 MHz;

an RF element, coupled to the cable source, having a plurality of terminals, and comprising a transponder;

a plurality of devices, each device including a cable networking interface that is coupled to a terminal of the RF element by way of coaxial cable, and that is for transmitting and receiving signals in a home network frequency band above the source frequency limit, the home network frequency band allocated by the CMTS; and a home cable networking modem, coupled to a terminal of the RF element, for receiving signals transmitted by, and for transmitting signals to, a cable networking interface of one of the plurality of devices in the home network frequency band.

9. The network according to claim 8 wherein the CMTS is adapted to allocate the home network frequency band to prevent interference with other home networks.

10. The network according to claim 8 wherein the CMTS allocates the same home network frequency band to at least one other home network.

11. The network according to claim 10 wherein the RF element further comprises at least one filter for blocking signals in the home network frequency band from being applied to the cable source.

12. The network according to claim 10 wherein the RF element further comprises a splitter with high reflections in the home network frequency band.

13. A home cable networking (HCN) device, comprising:
a coaxial cable interface, coupled to a coaxial cable television (CATV) cable, for communicating signals within a frequency range below a source frequency limit;
a home network interface for receiving and transmitting communication signals, over a coaxial cable, and within a home network frequency band above the source frequency limit, among a plurality of devices in a home;
a computer interface, for communicating with a computer; and
circuitry for modulating signals received from the computer over the computer interface, and for converting signals received from the plurality of devices over the home network interface, into Internet Protocol (IP) signals for transmission over the coaxial cable interface, and for demodulating IP signals received over the coaxial cable interface and transmitting the demodulated IP signals over the computer interface and the home network interface.

14. The HCN device according to claim 13 wherein the device comprises a set-top box.

15. The HCN device according to claim 13 wherein the home frequency band is between 900–960 MHz.

16. A home cable networking (HCN) device, comprising:
a coaxial cable interface, coupled to a coaxial cable television (CATV) cable and to a cable modem termination station (CMTS), for communicating signals within a frequency range below a source frequency limit; and
a home network interface for receiving and transmitting communication signals among a plurality of devices in a home over a coaxial cable, and within a home network frequency band selected by the CMTS and above the source frequency limit.

17. The HCN device according to claim 16 wherein the communication signals received and transmitted over the home network interface are based on the IEEE 802.11 standard.

18. The HCN device according to claim 17 further comprising an encryption function for encrypting data transmitted and received over the home network interface.

* * * * *